US006016751A

United States Patent [19]

Hess

[11] Patent Number: 6,016,751

[45] Date of Patent: Jan. 25, 2000

[54] DEVICE AND METHOD FOR MONITORING THE AMOUNT OF A FLUID SPRAYED ACROSS THE WIDTH OF MOVING MATERIAL WEBS FOR THE MOISTENING THEREOF

[75] Inventor: Günter Hess, Reutlingen, Germany

[73] Assignee: Weitmann & Konrad GmbH & Co. KG, Leinfelden-Echterdingen, Germany

[21] Appl. No.: 09/077,886

[22] PCT Filed: Nov. 16, 1996

[86] PCT No.: PCT/EP96/05043

§ 371 Date: Jun. 12, 1998

§ 102(e) Date: Jun. 12, 1998

[87] PCT Pub. No.: WO97/21544

PCT Pub. Date: Jun. 19, 1997

[30] Foreign Application Priority Data

Dec. 12, 1995 [DE] Germany .......................... 195 46 260

[51] Int. Cl.[7] .................................. B41F 7/30; G01J 3/50

[52] U.S. Cl. .......................... 101/484; 101/148; 101/492; 101/DIG. 45; 250/559.39; 364/469.01; 356/429; 356/448

[58] Field of Search .................................... 101/483, 484, 101/492, 147, 148, 216, 450.1, 365, DIG. 45; 250/559.39; 364/469.01; 356/425, 430, 445, 446, 448

[56] References Cited

U.S. PATENT DOCUMENTS 4,485,737 12/1984 Jeschke .................................. 101/148
4,852,485 8/1989 Brunner .................................. 101/365
5,031,534 7/1991 Brunner .................................. 101/365
5,038,681 8/1991 Hultberg et al. ........................ 101/484
5,050,994 9/1991 Kipphan et al. ........................ 101/147
5,341,734 8/1994 Jeschke et al. ......................... 101/148
5,368,817 11/1994 Sudo et al. ............................. 101/148
5,520,113 5/1996 Joss et al. .............................. 101/484
5,568,769 10/1996 Leverer ............................... 101/450.1
5,689,425 11/1997 Siano et al. ........................ 250/559.39
5,745,365 4/1998 Parker ................................ 364/469.01

FOREIGN PATENT DOCUMENTS 2 058 667 5/1972 Germany .
4227136A1 2/1994 Germany .

*Primary Examiner*—Eugene Eickholt
*Attorney, Agent, or Firm*—Jones, Tullar & Cooper, P.C.

[57] ABSTRACT

A method for monitoring the amount of moisture sprayed on a moving material web or a roller across their width, with the width being divided into individual measurement areas includes a measuring step, a storing step and further measuring steps. The measurement is made of local droplet flow of the sprayed liquid in the individual measurement areas, storing the measured values as set values, and again measuring the local droplet flow and comprising it to the set values. The device used includes a counting device and an evaluation unit. The counting device registers droplets of the liquid sprayed on the moving material web in a respective one of the individual measurement areas, and generates a signal per registered droplet which is supplied to the evaluation unit.

21 Claims, 3 Drawing Sheets

DEVICE AND METHOD FOR MONITORING THE AMOUNT OF A FLUID SPRAYED ACROSS THE WIDTH OF MOVING MATERIAL WEBS FOR THE MOISTENING THEREOF

This application is based on PCT/EP96/05043 filed Nov. 16, 1996

BACKGROUND OF THE INVENTION

1. Technical Field

The present invention relates a method for monitoring the amount of moisture sprayed across the width of moving material webs for moistening them over their width, a device for executing the method and the use of this device.

2. Background Art

In the graphic industry it is necessary to moisten rapidly moving paper webs during defined stages of processing, for example after they have been moved through a dryer for the drying of printing ink. The moisture can either be applied by means of a roller on which a liquid is sprayed, or by directly spraying the liquid on the rapidly moving paper web. In the process, the liquid is sprayed by a spraying device over the width transversely to the moving direction of the paper web, so that the entire width of the material web is moistened by the liquid. This technique for applying liquids has also proven itself in the textile, foil, non-woven, wood, tissue and other industries. A device for such moistening is known from DE 42 27 136 C2, for example. By means of such a device it is possible to moisten material webs evenly, and liquids of higher concentration and reduced water content can be applied to the material web. The spraying technique used permits a contactless and even application over the entire width of the material web without the formation of drops, so that gentle and tension-free material processing is provided and therefore the material structure is maintained.

Problems arise if the spraying device does not operate correctly, for example if one of the several spraying devices arranged next to each other to cover the full width of the material web does not operate correctly or even breaks down. In this case the material web is not correctly moistened, or even not moistened at all, in this area, so that the material web passed along the spraying device has strips which have been differently moistened. Since the moisture content of the material web, and therefore the incorrect moistening, can only be detected much later in the processing in a step, downstream of the spraying device, and since the material webs are conveyed at very high speeds in the range of 10 m/sec, great lengths of the material web are very rapidly insufficiently moistened or even unusable. Known methods for monitoring moistening therefore require very large amounts of material and are highly cost-intensive.

SUMMARY OF THE INVENTION

Based on this prior art, it is the object of an present invention to provide a remedy for the noted difficulty. A method, as well as a device for executing the method and the use of the method is intended to be made available here, by means of which the sprayed-on liquid can be simply and dependably monitored, and possible malfunctions can be detected early on.

This object is attained in accordance with the present invention by a method according to which a local droplet flow of the sprayed liquid is respectively measured for individual measurement areas, storing the measured local droplet flow values as set values, determining again the local droplet flows and comparing them with the previously measured set values of the associated measurement area; and a device including a counting device for the registration of droplets of the liquid sprayed in the respective individual measurement areas which can be brought into positions associated with the measurement areas and can generate one signal per registered droplet and supplied to an evaluation unit executing the method in accordance with claim 7.

By means of the method in accordance with the present invention it is possible to effectively monitor moistening or the application of liquids on a material web in a simple manner. If a spraying device, by means of which the liquid to be provided for moistening the material web is to be sprayed in the direction of the material web width, should not operate correctly, so that the material web is not moistened over its width in the desired manner, this can be immediately detected by means of the method in accordance with the present invention, by not determining the moisture content of the material web, but the sprayed amount of the liquid to be applied to the material web. By measuring values of local droplet flow and comparing the measured droplet flow values with previously determined set values, additional information is immediately provided regarding which one of the measuring sections operates insufficiently. In this case it is possible to preset the tolerances within which the local droplet flow values are allowed to diverge from the associated set values. A continuous control of the amounts of liquid sprayed on is always provided in this way, so that in case of the appearance of errors in moistening these errors can be evaluated and localized and, if necessary, the moistening process can be stopped. By means of this, material waste because of insufficient moistening of defined areas of the material web can be prevented.

In an embodiment of the present invention according to which the individual measurment areas are sequentially covered for determining the local droplet flows only one device for determining the local droplet flows is required.

Since as a rule it is intended to moisten the material web over its entire width, with the initially determined set values are compared with each other after having been set. If the set values do not agree within defined tolerances, the spraying devices already operate incorrectly from the start.

According to the embodiment of the present invention, following the initial determination of the set values, the local droplet flows are measured during repeated passages, in which the representative droplet flow of each measurement area is detected once and stored and that following each passage, the droplet flow values are compared with the set values determined during the first passage.

Each determined droplet flow is compared with its associated set value immediately after it has been determined. This indicates a somewhat more elaborate alternative for permanent monitoring of the sprayed liquid. This alternative has the advantage that incorrect operation can be detected more rapidly, because it is no longer necessary to wait for a complete passage as in the embodiment of claim 4.

A signal is provided in case of the deviation of at least one of the droplet flow values from the associated set value past a preset value. This signal which can be used in different ways, is made available in case of an incorrect operation of the spraying device. It would be possible, for example, to stop the treatment of the material web immediately, or it can be used for calling a specialist which first evaluates the discovered error.

Since the method in accordance with the present invention does not permit dependable statements regarding the quality of the entire liquid sprayed on the material web, because the sprayed liquid is only locally determined in individual measurement areas, the sprayed liquid is only monitored for a total outage in the respective measurement areas after a definite change of the sprayed amounts of liquid, for example after changing the web speed during a run. This is practical, since a comparison with initially determined set values is no longer possible because of the lack of the ability to determine absolute amounts of liquid.

A device for executing the method in accordance with the present invention consists of only one counting device, which determines the local droplet flow by means of registering individual droplets, and of an evaluation unit. All droplet flows can be sequentially registered by means of the counting device, in that the counting device can be moved into positions associated with the individual measurement areas. This represents a structurally simple and cost-efficient solution.

The droplets are advantageously optically registrable for measuring the droplet flows.

An advantageous embodiment of the counting device has a laser which illuminates one of the measurement areas associated with the counting device, and a photodiode which detects the laser light reflected by the droplets flying by.

Since the work area in which the material web is moistened becomes greatly soiled by the sprayed liquid, perforated screens are provided between the counting device and the sprayed liquid, so that the optically operating counting device is soiled as little as possible.

A further protection of the counting device results from the embodiment of the present invention, so that there is a possibility then of opening the perforated screens only when the measurement area associated with this perforated screen is intended to be covered by the counting device.

Since often the soiling of the counting device cannot be prevented, a cleaning device has been advantageously provided.

So that the function of the counting device can be checked, a checking device is provided, so that a function test can be performed, for example after a cleaning operation, which provides the assurance that the cleaning process has taken place successfully.

The counting device can be quickly and simply brought into positions associated with the individual measurement areas for determining the individual local droplet flows. The preferred monitoring in the immediate vicinity of the material web, i.e. shortly before the droplets impact the material web, is also possible by means of this.

Such an embodiment also permits the simple and space-saving attachment of the cleaning device and of the testing device.

The device in accordance with the invention can be advantageously employed in the most varied branches of industry.

The present invention will be explained in detail in what follows by means of an exemplary embodiment, making reference to the drawings.

DESCRIPTION OF A PREFERRED EMBODIMENT

Figure 2:
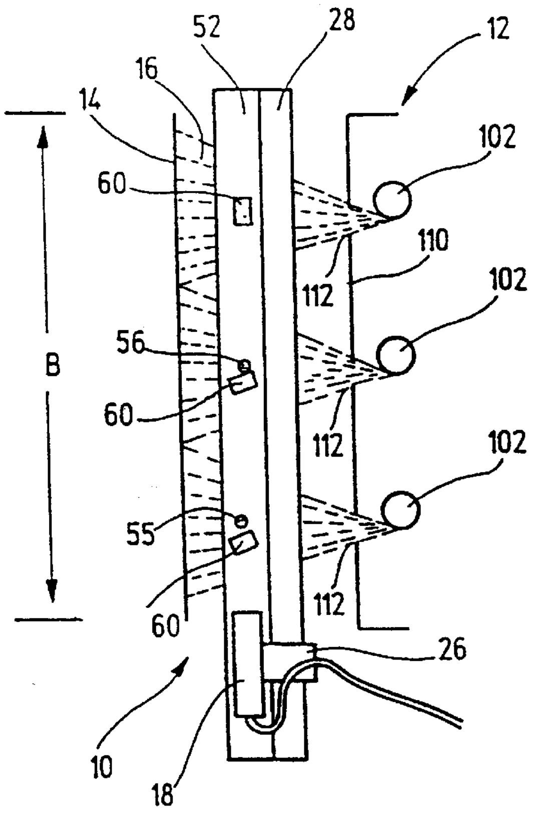
FIG. 2, which is a top view of the device of the present invention in accordance with FIG. 1.
Figure 1:
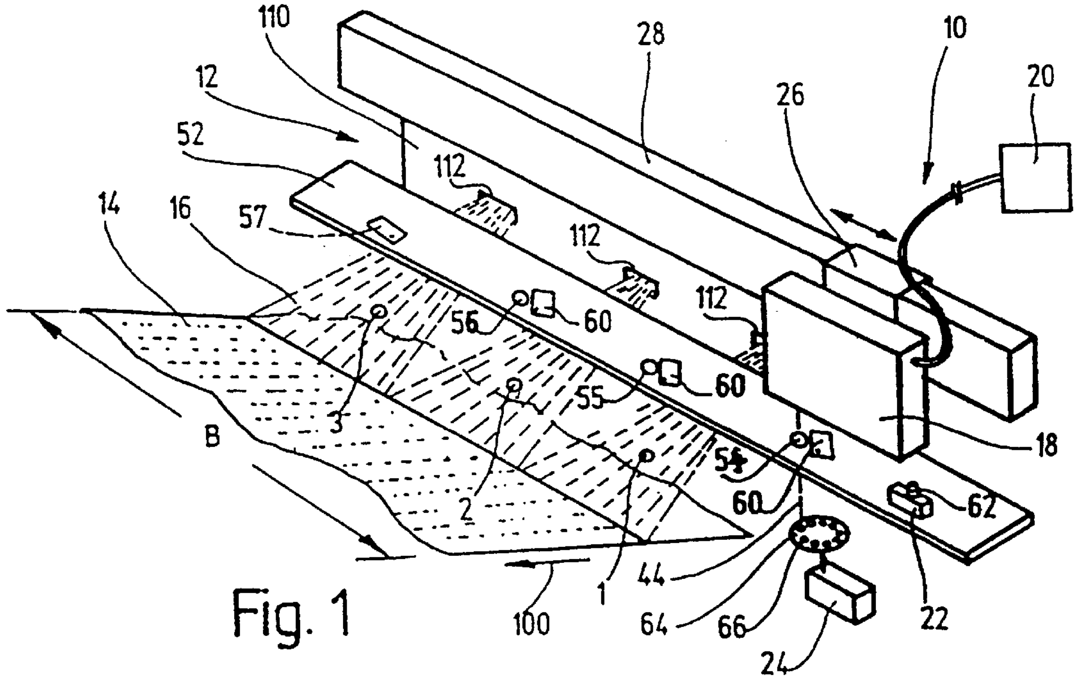
FIG. 1, which is a schematic plan view of a monitoring device in accordance with the present invention.

A spraying device 12, by means of which a liquid for moistening a moving material web 14 over a width B can be sprayed in the form of droplets, is represented next to a monitoring device 10 in accordance with the present invention is shown in FIGS. 1 and 2. The droplets of liquid are represented as short lines or dots 16. Besides the direct moistening of the material web 14 with the liquid, as represented in FIGS. 1 and 2, the material web 14 can also be indirectly moistened, in that initially the liquid can be sprayed on a roller, and then transferred from this roller to the material web 14.

The monitoring device 10 has a counting device 18, an evaluation device 20 and preferably a cleaning device 22 and a testing device 24.

The counting device 18 is attached to a carriage 26, which is seated, preferably displaceable in the longitudinal direction, on a guide support 28. The guide support 28 extends perpendicularly to the direction of running of the material web 14 preferably at least over the width B of the material web, so that the counting device 18 can be positioned at any location over the entire width of the material web 14. Preferably the guide support 28 is arranged in the immediate vicinity of the spraying device 12 and the material web 14, so that the counting device 18 can be brought into positions on the guide support 28, in which the counting device 18 can count the droplets 16 flying through the measurement areas 1, 2 and 3. The measurement areas 1, 2 and 3 represented in FIGS. 1 and 2 are only examples. Depending on the width B of the material web, a larger or smaller number can be provided.

Figure 3:
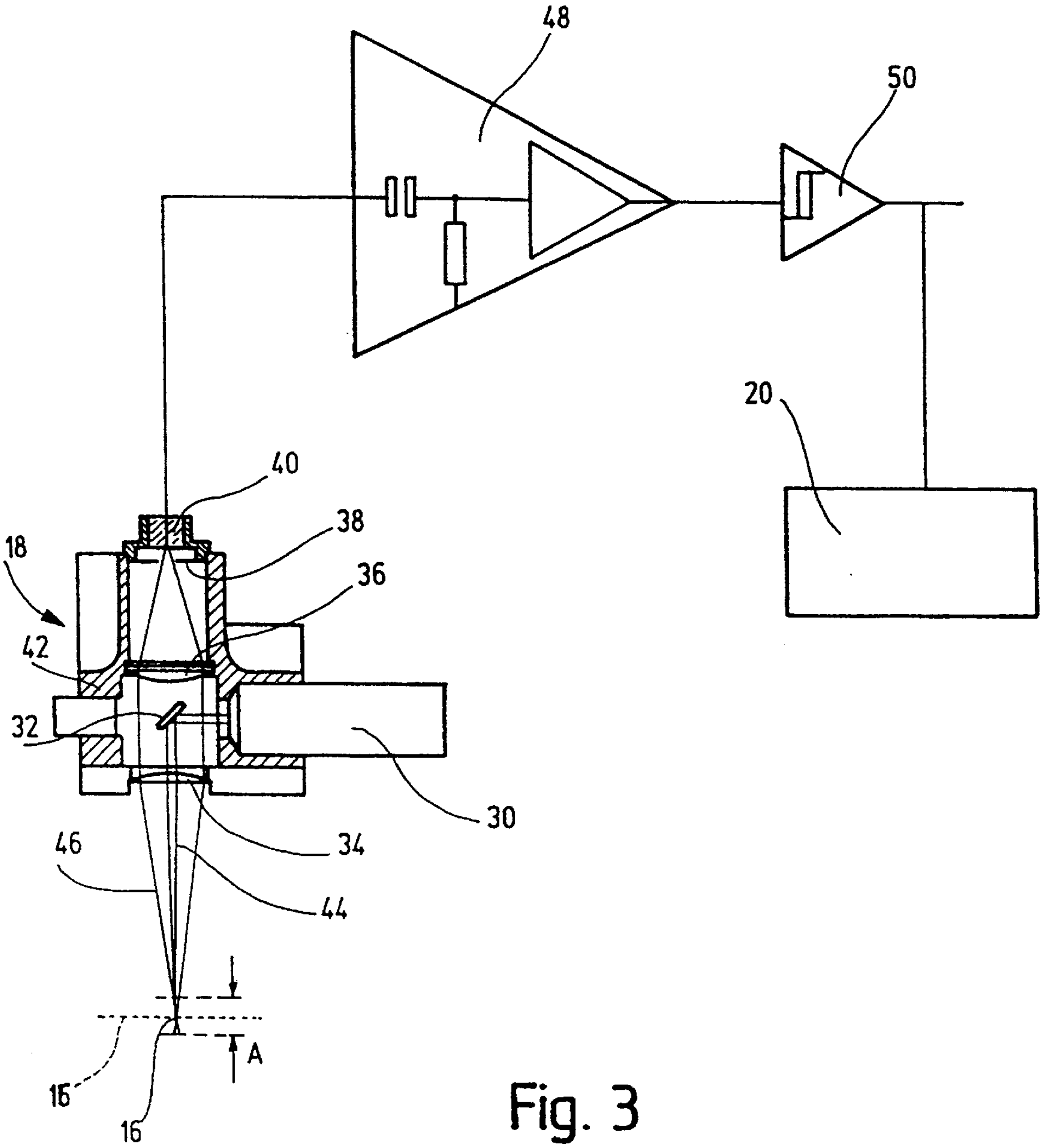
FIG. 3, which is a cross section through a counting device switched together with an evaluation device.

As represented in FIG. 3, the countering device 18 has a light source, preferably a semiconductor later 30, a mirror 32, a lens system consisting of lenses 34 and 36, a screen 38 and a photodiode 40. These elements of the counting device 18 are housed in a housing 42. In FIG. 3, the emitted laser light is represented as beams 44, and the light received by the photodiode as beams 46.

The photodiode 40 is connected via an amplifier 48 and a comparator 50 with the evaluation unit 20.

A screen 52 is provided between the counting device 18, which is displaceable along the guide support 28, and the sprayed liquid, which has openings, preferably round holes, so that perforated screens 54, 55, 56 and 57 are formed. The perforated screens 55, 56 and 57 define the measurement areas 1, 2 and 3, which can be optically covered by the counting device. Preferably the perforated screens 54 to 57 can be closed by means of cover plates 60.

The cleaning device 22 is provided in the area of the one end of the guide support 28. The cleaning device 22 can be connected to a compressed air source, not represented, and has a nozzle 62, from which the compressed air can flow. Furthermore, testing device 24 is provided at one of the ends of the guide support 28. The testing device 24 has a disk 64, which can be rotated at a defined angular velocity and has concentrically arranged openings 66, which preferably are at an even distance from each other around the circumference. The disk 64 is arranged in such a way that the laser beam 44 of the counting device 18 positioned in the area of the end of the guide support 28 can shine through the openings 66.

When the disk rotates, the laser beam 44 can be interrupted by means of the disk, which has the openings 66 and rotates.

The method in accordance with the present invention is executed with the aid of the described device in accordance with the invention as follows:

The material web 14 is moved past the spraying device 12, for example in the direction of the arrow 100. A liquid, for example water or a suitable liquor, is sprayed over the width B by the spraying device 12, so that preferably the entire width B of the material web is covered.

Figure 4:
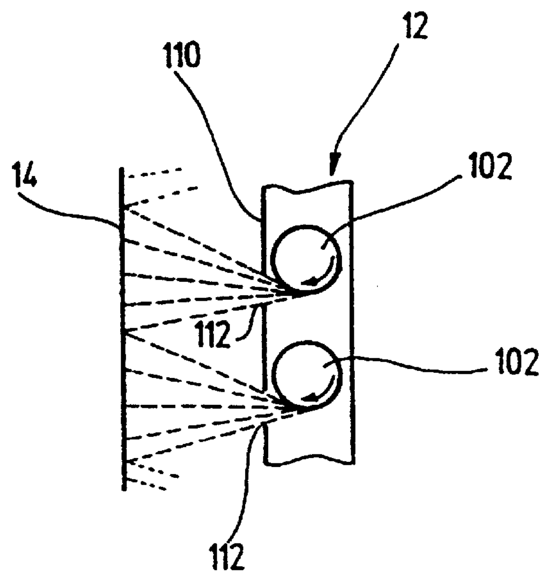
FIGS. 4 and 5, which show a schematic representation of components of a spraying device.
Figure 5:
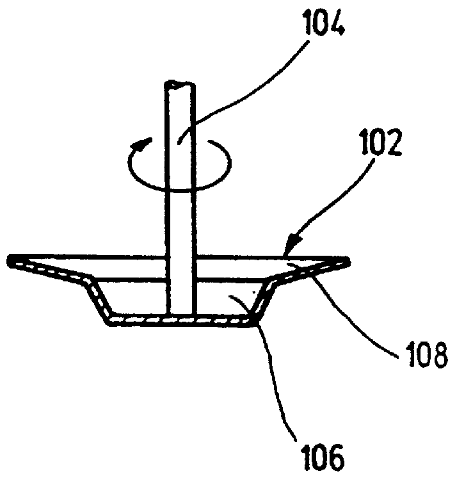

An example of a spraying device 12, which can be preferably employed by means of the method of the present invention and the device in accordance with the present invention, is represented in FIGS. 4 and 5. As indicated in FIG. 4, the spraying device has a plurality of rotatable plates 102, which are arranged next to each other in a row transversely with respect to the longitudinal direction of the material web 14 and parallel with respect to the guide support 28. As FIG. 5 shows, the rotatable plates 102 are preferably attached to the lower end of a driveshaft 104 and have a central cup area 106, which is followed by a radially outward extending flat spray flange 108. For driving the rotatable plates 102, their respective driveshafts 104 are connected with a motor in a suitable manner, not shown in detail.

In order to fix a defined spraying area for each rotatable plate 102 of the spraying device 12, a screen 110 is arranged between the rotatable plates 102 arranged in a row and the material web 14, which has a through-opening 112 for the liquid to be sprayed on the material web 14 in the area of each rotatable plate 102. The spraying areas defined in this way are fan-shaped and form individual sectors, which advantageously adjoin each other flush at the level of the material web, such as shown in FIGS. 1, 2 and 4.

However, a spraying device can also he employed, which has a roller whose width corresponds to the width of the material web and whose axis is arranged parallel with the guide support 28. The spray extending over the width of the material web is created in that the liquid placed on the surface of the roller is sprayed by the rapid rotation of the roller, and this sprayed liquid exits through a slit-shaped opening, whose slit width corresponds to the width of the material web.

A further possible spray device consists of individual spray nozzles arranged next to each other, whose sprays together cover the width of the material web.

The method for monitoring the amount of liquid sprayed in the width direction operates as follows:

Initially, the counting device 18 is cleaned by means of the cleaning device 22, in that by means of the compressed air exiting the nozzle 62, dirt is directly blown off the counting device 18, in particular the optical device of the counting device 18.

Thereafter the counting device 18 is brought into the test position represented in FIG. 1, in which the laser beam 44 passes through the opened perforated screen 54 and illuminates the disk 64. The surface of the disk 64 has a reflecting coating. Then the laser beam 44 is interrupted at a defined frequency by the rotating disk 64. When the laser beam 44 is interrupted by the disk 64, a light reflection is created by the reflecting surface of the disk 64. The reflected light 46 is bundled by the lenses 34 and 36 and imaged on the photodiode 40. The photodiode 40 generates a signal, which is supplied to the amplifier 48 to be amplified and differentiated there and subsequently sent on to the comparator 50. The comparator 50 then passes one pulse per signal on to the evaluation unit. The pulses received by the evaluation unit 20 are compared with the angular speed of the disk 64, so that it can be determined whether every reflex of the laser beam 44 had been registered.

A first measurement pass is started after the function test has been performed. To this end, the counting device 18 is brought into a first measuring position along the guide support 28, so that the counting device 18 can cover the first measurement area 1. To this end, the perforated screen 55 is opened, so that the laser beam 44 illuminates the first measurement area 1. The light 46, reflected by the individual droplets 16 flying through the first measurement area 1, is now registered by the counting device 18 and, as described above, provided to the evaluation unit 20 as an electrical pulse per passing droplet 16 (see FIG. 3). The number of drops per unit of time, preferably 1.7 sec, is now counted in this way. An average value is determined from six such measurements in the evaluation unit 20, which represents the local droplet flow for the first measurement area 1. The droplet flow value is stored as a set value for the first measurement area 1 in the evaluation unit 20.

Only the droplets 16, which fly by the counting device 18 in a working area A, are optically detected in the course of registering the droplets 16 by the counting device 18. The working area A is defined by the opening of the screen 38. Therefore the distances between the counting device 18 and the individual measurement areas are the same for all measurement areas and are matched to the opening of the screen 38, so that the fan-like spray areas lie within the working area A.

The perforated screen 55 is now closed again and the counting device 18 is moved to the second measurement area 2. A set value in relation to the measurement area 2 is determined and stored in the same way. The set values for the further measurement areas, only a third one is represented in FIGS. 1 and 2, are also determined and stored.

If the material web 14 is intended to be moistened over its entire width B, a check is now advantageously made to determine whether the set values of the individual measurement areas do not deviate too greatly among themselves. If the deviation is too great, it is a sign that the spraying device 12 is not operating correctly, for example because a rotatable disk 102 is defective.

The counting device 18 is again moved into the first measurement position after this, and a local droplet flow is again measured in the first measurement area 1 and stored in the evaluation unit 20. Afterwards the further measurement areas 2 and 3 are covered.

After this passage, the measured droplet flow values of the three measurement areas are compared with the corresponding set values in the evaluation unit 20. If, for example, the measured droplet flow of the second measurement area 2 deviates past a predetermined tolerance threshold from the second set value, a signal, for example a warning light, is preferably actuated. The operator of the device can then immediately determine that too little liquid has reached the material web in the measurement area 2, i.e. that the spraying device 12 operates incorrectly in this area.

After this passage, the droplet flows of the individual measurement areas are measured during repeated passages and compared with the set values after each passage. A continuous check of the amount of liquid sprayed on the material web is provided in this way. Alternatively it is also possible to compare the respectively measured droplet flow with the associated set value immediately after it has been detected.

Correct positioning into the test and measuring positions of the counting device 18 on the guide support 28 is respectively performed by means of an inductive switch, not represented.

It should be noted that it is not possible to draw conclusions regarding the absolute amount of liquid sprayed in the associated fan-shaped sector by means of the number of droplets measured in respect to one measurement area. However, the method with accordance with the present invention is excellently suited to monitor the sprayed-on amount of liquid, in that, starting from local set values once established, the instantaneous local droplet flow values are measured and compared with the set values, i.e. it is only possible to make relative statements regarding the amount of liquid to be monitored.

For this reason, if the amount of liquid sprayed during one passage is changed, it is no longer possible to make a comparison of the measured droplet streams with the set values. A change in the amount of liquid sprayed is necessary, for example if, after a change of its conveying speed, the material web 14 is to be moistened with the same amount as before. However, reduced monitoring is nevertheless possible in that only the presence of local droplet flows in the individual measurement areas is registered. Then the rotatable plates 102 of the spraying device 12 are only monitored for a total outage. It is recommended to determine new set values at the termination of the monitoring passage.

The counting device 18 is cleaned and functionally checked at the end of the monitoring process, i.e. at the termination of all passages.

I claim:

1. A method for monitoring the amount of moisture sprayed on a moving material web across its width, comprising the steps of:

measuring a local droplet flow of the sprayed liquid for individual measurement areas over the width of the material web, respectively;

storing the measured values of the local droplet flow as set values; and again measuring the local droplet flow of the sprayed liquid in the individual measurement areas over the width of the material web and comparing these measurements with said set values.

2. The method as defined in claim 1, wherein the individual measurement areas are sequentially covered in order to determine their local droplet flows.

3. The method as defined in claim 1, further comprising the step of:

comparing the stored set values with each other.

4. The method as defined in claim 1, further comprising the step of:

measuring and comparing the local droplet flows in each measurement area with the initial set values repeatedly.

5. The method as defined in claim 1, wherein each measured local droplet flow is compared with its associated set value immediately after it is determined.

6. The method as defined in claim 1, further comprising the step of:

generating a signal if after any comparison a deviation is detected between the measured value and the associated set value.

7. The method as defined in claim 1, wherein the local droplet flows in the respective measurement areas only are measured after the amount of liquid sprayed is changed.

8. A device for monitoring the amount of moisture sprayed on a moving material web across its width, the width being divided into individual measurement areas, comprising:

a counting device;

means for mounting said counting device and positioning it relative to each individual mesurement area; and an evaluation unit, said counting device registering droplets of the liquid sprayed on the moving material web in a respective one of the individual measurement areas and generating a signal per registered droplet which is supplied to said evaluation unit.

9. The device as defined in claim 8, wherein said counting device includes optical means and wherein said registration is an optical registration.

10. The device as defined in claim 8, wherein said counting device includes a laser for illuminating the measurement areas, and a photodiode which detects the laser light reflected by the droplets flying by.

11. The device as defined in claim 8, further comprising:

perforated screens associated with each measurement area situated between said counting device and the sprayed liquid.

12. The device as defined in claim 11, further comprising:

means for covering said perforated screens.

13. The device as defined in claim 8, further comprising:

a cleaning device for cleaning said counting device.

14. The device as defined in claim 13, wherein said cleaning device uses compressed air to clean said counting device.

15. The device as defined in claim 8, further comprising:

a testing device for testing the function of said counting device.

16. The device as defined in claim 15, wherein said testing device includes a disk with concentrically arranged openings, said disk being rotated at a defined angular velocity, wherein said counting device includes a laser for illuminating the measurement areas, and wherein the rotation of said disk is such that it interrupts the light beam from said laser.

17. The device as defined in claim 8, further comprising:

a guide support which extends over at least the width of the material web, and wherein said counting device is mounted on said guide support to be longitudinally displaceable.

18. The device as defined in claim 17, further comprising:

a cleaning device for cleaning said counting device; and a testing device for testing the function of said counting device, wherein at least one of said cleaning device and said testing device are located at one end of said guide support.

19. In an offset printing press having a roller, a device for monitoring the amount of moisture sprayed on the roller across its width, the width being divided into individual measurement areas, comprising:

a counting device;

means for mounting said counting device and positioning it relative to each individual measurement area; and an evaluation unit, said counting device registering droplets of the liquid sprayed on the moving material web in a respective one of the individual measurement areas and generating a signal per registered droplet which is supplied to said evaluation unit.

20. In an offset printing press having a moving material web, device for monitoring the amount of moisture sprayed on the material web across its width, the width being divided into individual measurement areas, comprising:

a counting device;

means for mounting said counting device and positioning it relative to each individual measurement area; and an evaluation unit, said counting device registering droplets of the liquid sprayed on the moving material web in a respective one of the individual measurement areas and generating a signal per registered droplet which is supplied to said evaluation unit.

21. The device as defined in claim 8, wherein the material web is one of a textile material web, a foil web, a non-woven web, and a cellulose-containing material web.

* * * * *